(12) United States Patent
Owusu-Sekyere

(10) Patent No.: US 11,040,646 B2
(45) Date of Patent: Jun. 22, 2021

(54) HEAD SECURING ASSEMBLY

(71) Applicant: Nana Owusu-Sekyere, Houston, TX (US)

(72) Inventor: Nana Owusu-Sekyere, Houston, TX (US)

( * ) Notice: Subject to any disclaimer, the term of this patent is extended or adjusted under 35 U.S.C. 154(b) by 133 days.

(21) Appl. No.: 16/359,722

(22) Filed: Mar. 20, 2019

(65) Prior Publication Data

US 2020/0298740 A1 Sep. 24, 2020

(51) Int. Cl.
*B60N 2/885* (2018.01)
*B60N 2/865* (2018.01)
*B60R 22/00* (2006.01)

(52) U.S. Cl.
CPC .............. *B60N 2/885* (2018.02); *B60N 2/865* (2018.02); *B60R 22/001* (2013.01)

(58) Field of Classification Search
CPC ........ B60N 2/865; B60N 2/885; B60R 22/001
See application file for complete search history.

(56) References Cited

U.S. PATENT DOCUMENTS

| | | | |
|---|---|---|---|
| 2,642,927 A * | 6/1953 | Rising | B60N 2/882 297/398 |
| 4,154,478 A | 5/1979 | Cohune | |
| 4,971,393 A * | 11/1990 | Maisenhalder | A47C 7/383 297/397 |
| 5,505,523 A * | 4/1996 | Wang | A47C 7/383 128/870 |
| 5,567,015 A | 10/1996 | Arias | |
| 5,613,736 A | 3/1997 | Schaked | |
| 5,868,471 A * | 2/1999 | Graham | A47C 7/383 297/397 |
| 6,460,927 B1 * | 10/2002 | Groth | A61G 5/12 297/284.9 |
| 6,601,804 B2 | 8/2003 | Bisch | |
| 6,893,094 B2 | 5/2005 | O'Connor | |
| 6,935,695 B2 * | 8/2005 | Carta Gonzalez | A47C 7/383 297/397 |
| D584,908 S | 1/2009 | Diffrient | |
| 7,744,158 B2 | 6/2010 | Schurg | |
| 9,701,231 B2 * | 7/2017 | Arriola | B60N 2/882 |
| 10,118,526 B1 * | 11/2018 | Fan | B60N 2/874 |
| 2001/0054837 A1 * | 12/2001 | O'Connor | B60N 2/868 297/397 |

(Continued)

FOREIGN PATENT DOCUMENTS

| | | | | |
|---|---|---|---|---|
| JP | 2004008362 A | * | 1/2004 | ............. B60N 2/885 |
| JP | 2004161213 A | * | 6/2004 | ............. B60N 2/885 |
| JP | 2005040509 A | * | 2/2005 | ............. B60N 2/885 |

*Primary Examiner* — David R Hare
*Assistant Examiner* — Alexis Felix Lopez

(57) ABSTRACT

A head securing assembly for supporting a user's head while sleeping and sitting upright in a seat includes a pair of clamps that is each positionable on a top side of a backrest of a seat in a vehicle. Each of the clamps is positioned on opposite sides of a headrest post with respect to each other. A support is coupled to each of the clamps and the support is directed forwardly from the backrest of the seat. A pair of cushions is each slidably coupled to the support and each of the cushions can be positioned on opposite sides of a user's head when the user sits in the seat. In this way the user's head is inhibited from tipping to the left or to the right when the user is sleeping.

4 Claims, 4 Drawing Sheets

(56) References Cited

U.S. PATENT DOCUMENTS

| | | | | |
|---|---|---|---|---|
| 2002/0185573 A1* | 12/2002 | Bisch | ............... | B60N 2/882 |
| | | | | 248/118 |
| 2007/0273194 A1* | 11/2007 | Fraser | ............... | A47C 7/383 |
| | | | | 297/397 |
| 2010/0289315 A1* | 11/2010 | Jackson | ............ | B60N 2/882 |
| | | | | 297/397 |
| 2012/0007405 A1* | 1/2012 | Kim | ............... | B60N 2/882 |
| | | | | 297/397 |
| 2013/0187428 A1* | 7/2013 | Albino | ............ | B60N 2/885 |
| | | | | 297/397 |
| 2015/0145307 A1* | 5/2015 | Arriola | ............ | B60N 2/844 |
| | | | | 297/397 |
| 2018/0312092 A1* | 11/2018 | Karzai | ............ | B60N 2/882 |
| 2018/0370398 A1* | 12/2018 | Chiang | ............ | B60N 2/885 |
| 2019/0152371 A1* | 5/2019 | Carlson | ............ | B60N 2/882 |

\* cited by examiner

HEAD SECURING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to securing device and more particularly pertains to a new securing device for supporting a user's head while sleeping and sitting upright in a seat.

BRIEF SUMMARY OF THE INVENTION

An embodiment of the disclosure meets the needs presented above by generally comprising a pair of clamps that is each positionable on a top side of a backrest of a seat in a vehicle. Each of the clamps is positioned on opposite sides of a headrest post with respect to each other. A support is coupled to each of the clamps and the support is directed forwardly from the backrest of the seat. A pair of cushions is each slidably coupled to the support and each of the cushions can be positioned on opposite sides of a user's head when the user sits in the seat. In this way the user's head is inhibited from tipping to the left or to the right when the user is sleeping.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
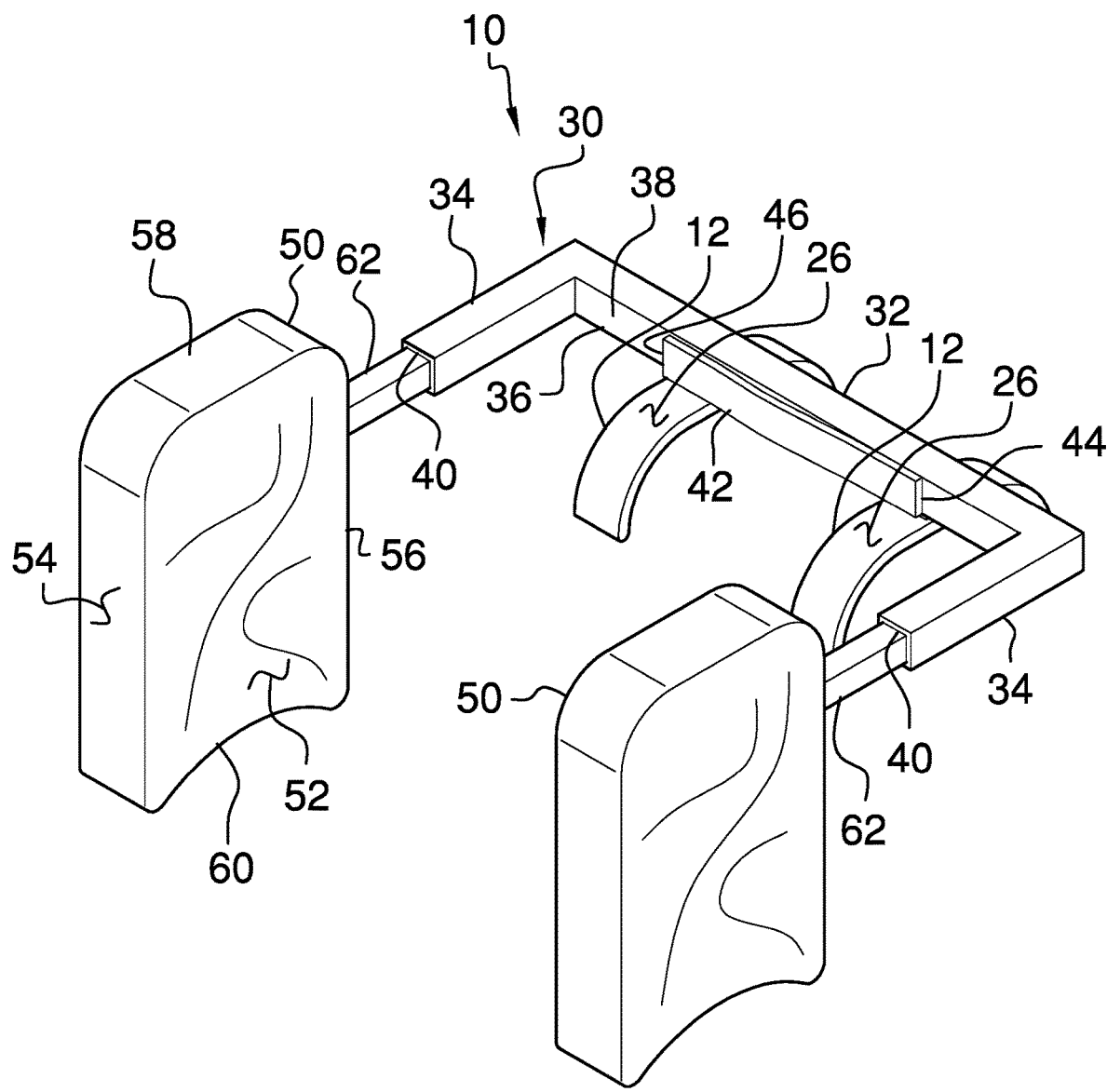
FIG. 1 is a perspective view of a head securing assembly according to an embodiment of the disclosure.
Figure 2:
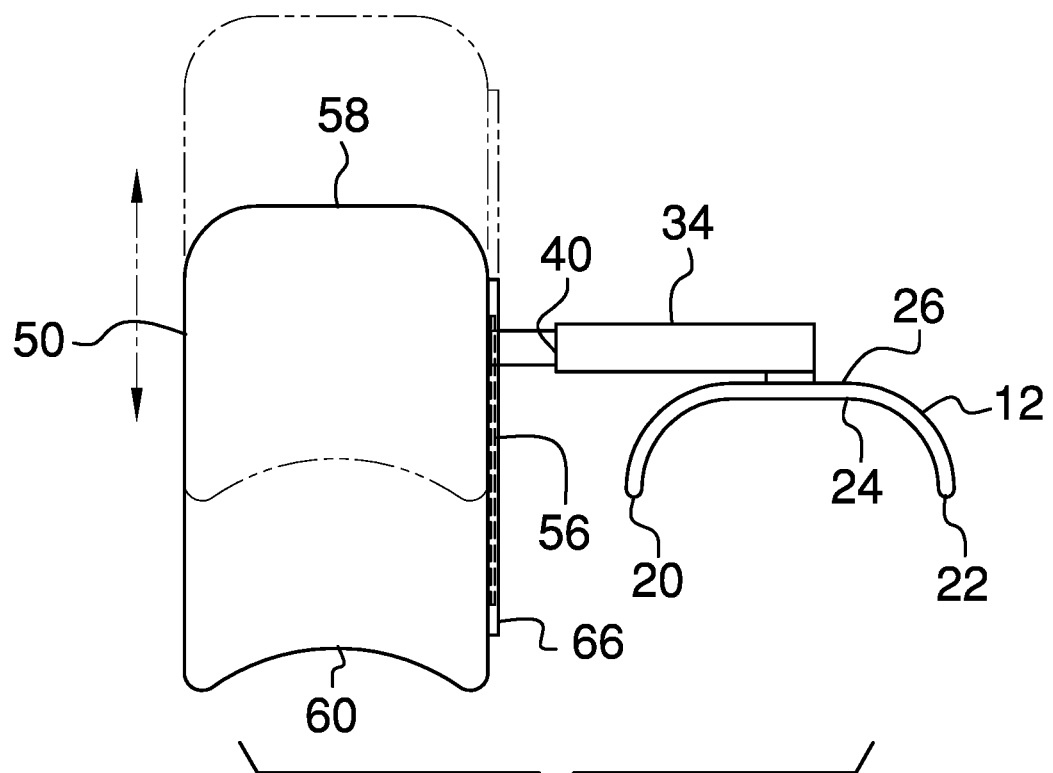
FIG. 2 is a right side view of an embodiment of the disclosure.
Figure 3:
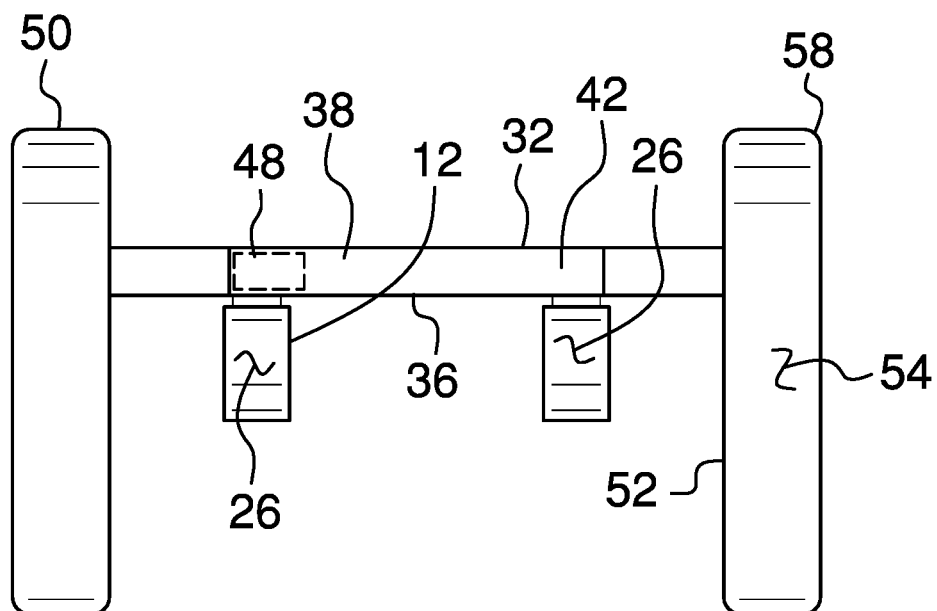
FIG. 3 is a front view of an embodiment of the disclosure.
Figure 4:
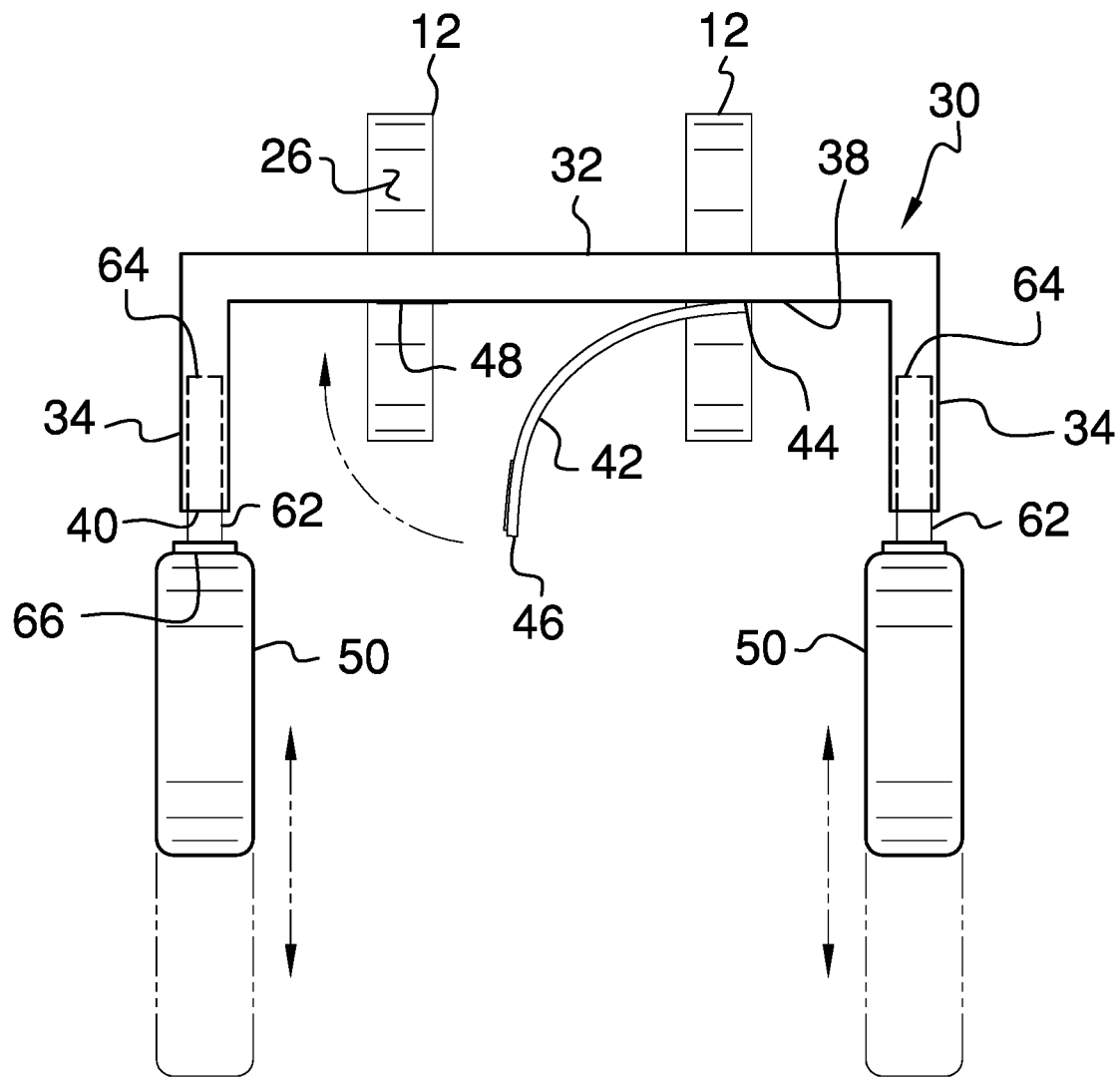
FIG. 4 is a top view of an embodiment of the disclosure.
Figure 5:
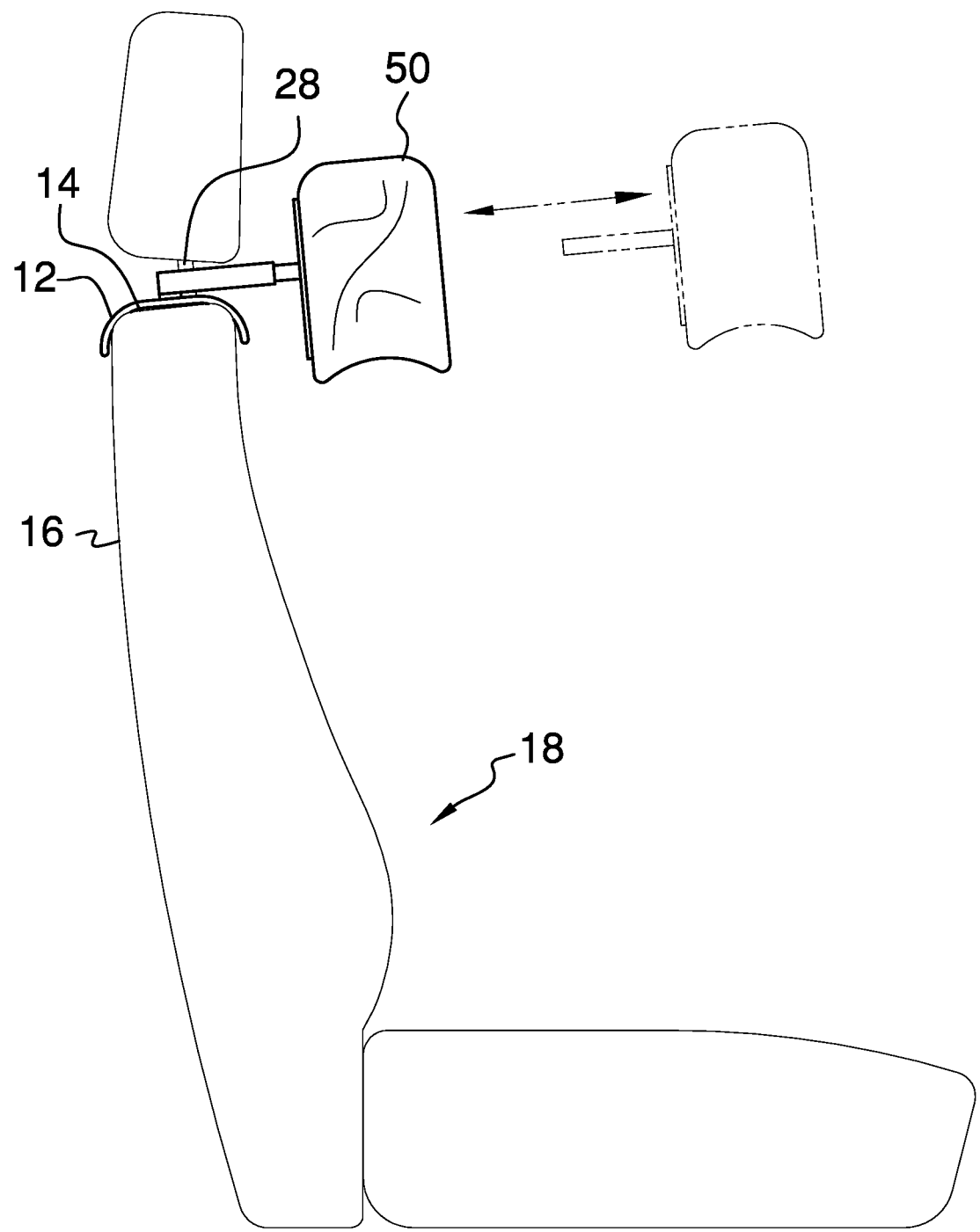
FIG. 5 is a perspective in-use view of an embodiment of the disclosure.

With reference now to the drawings, and in particular to FIGS. 1 through 5 thereof, a new securing device embodying the principles and concepts of an embodiment of the disclosure and generally designated by the reference numeral 10 will be described.

As best illustrated in FIGS. 1 through 5, the head securing assembly 10 generally comprises a pair of clamps 12 that is each positionable on a top side 14 of a backrest 16 of a seat 18 in a vehicle. The vehicle may be a passenger vehicle such as a car, a commercial travel vehicle such as an airplane or bus, or any other motorized vehicle, Each of the clamps 12 has a first end 20, a second end 22, a bottom surface 24 and a top surface 26. The bottom surface 24 of each of the clamps 12 is concavely arcuate between the first 20 and second 22 ends such that the first end 20 a respective one of the clamps 12 is spaced from the second end 22 of the respective clamp 12. Thus, each of the clamps 12 forms a U shape wherein to conform to the top side 14 of the backrest 16. Each of the clamps 12 is positioned on opposite sides of a headrest post 28 with respect to each other.

A support 30 is coupled to each of the clamps 12 and the support 30 is directed forwardly from the backrest 16 of the seat 18. The support 30 has a central member 32 extending between a pair of outward members 34, and the central member 32 has a bottom side 36 and a front side 38. The bottom side 36 is coupled to the top surface 26 of each of the clamps 12 having the central member 32 extending between and beyond each of the clamps 12. Each of the outward members 34 is hollow, each of the outward members 34 has a distal end 40 with respect to the central member 32 and the distal end 40 of each of the outward members 34 is open.

A strap 42 is provided that has a primary end 44 and a secondary end 46, and the primary end 44 is coupled to the front side 38 of the central member 32. The strap 42 is oriented collinear with the central member 32 and the central member 32 is positioned behind the headrest post 28. Moreover, the strap 42 is extended in front of the headrest post 28 when the clamps 12 are positioned on the top side 14 of the backrest 16. A mating member 48 is coupled to the front side 38 of the central member 32 and the mating member 48 is spaced from the primary end 44 of the strap 42. The secondary end 46 of the strap 42 releasably engages the mating member 48 to couple the central member 32 to the headrest post 28. The mating member 48 may be a hook and loop fastener or other type of multiple use, releasable fastener.

A pair of cushions 50 is each slidably coupled to the support 30. Additionally, each of the cushions 50 is positioned on opposite sides of a user's head when the user sits in the seat 18. In this way the cushions 50 inhibit the user's head from tipping to the left or to the right when the user is sleeping. Each of the cushions 50 has a first surface 52 and a perimeter surface 54, and the perimeter surface 54 has a back side 56, a top side 58 and a bottom side 60. The bottom side 60 of the perimeter surface 54 is upwardly arcuate on the perimeter surface 54 to conform to a respective one of the user's shoulders. The top side 58 of the perimeter surface 54 of each cushions 50 may be co-arcuate with the bottom side 60 of the perimeter surface 54 such that the top side 58 of the perimeter surface is rounded.

A pair of posts 62 is each coupled to a respective one of the cushions 50. Each of the posts 62 is positioned on the back side 56 of the perimeter surface 54 of the respective cushion 50 and each of the posts 62 has a distal end 64 with respect to the respective cushion 50. The distal end 40 of each of the outward members 34 of the support 30 insertably receives the distal 64 end of a respective one of the posts 62. Thus, the first surface 52 of each of the cushions 50 can engage a respective right and left side of the user's head. Moreover, each of the cushions 50 is spaceable a selected distance from the central member 32. Each of the cushions 50 includes a coupling 66 that is attached to the back side 56 of the perimeter surface 54 of the cushions 50. Each of the posts 62 slidably engages the coupling 66 on the respective cushion 50 for adjusting the cushions 50 upwardly and downwardly on the posts 62.

In use, each of the clamps 12 is positioned on the top side 14 of the backrest 16 of the seat 18 having the central member 32 being positioned behind the headrest post 28. The strap 42 is extended across the headrest post 28 and engages the mating member 48 to secure the clamps 12 and the support 30 on the backrest 16. The post 28 on each of the cushions 50 is inserted into the respective outward member 34 of the support 30 thereby positioning each of the cushions 50 on opposite sides of the user's head when the user sits in the seat 18. In this way the cushions 50 inhibit the user's head from tipping to the left or the right when the user is sleeping. Thus, the user can sleep comfortably while seated in an upright position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A head securing assembly being configured to be mounted on a seat in a vehicle for laterally supporting a person's head, said assembly comprising:
   a pair of clamps, each of said clamps being positionable on a top side of a backrest of a seat in a vehicle, each of said clamps being positioned on opposite sides of a headrest post with respect to each other;
   a support being coupled to each of said clamps, said support being directed forwardly from the backrest of the seat; and
   a pair of cushions, each of said cushions being slidably coupled to said support wherein each of said cushions is configured to be positioned on opposite sides of a user's head when the user sits in the seat thereby inhibiting the user's head from tipping to the left or to the right when the user is sleeping
   wherein each of said clamps has a first end, a second end, a bottom surface and a top surface, said bottom surface of each of said clamps being concavely arcuate between said first and second ends such that said first end a respective one of said clamps is spaced from said second end of said respective clamp having each of said clamps forming a U shape wherein each of said clamps is configured to conform to the top side of the backrest;
   wherein said support has a central member extending between a pair of outward members, said central member having a bottom side and a front side, said bottom side being coupled to said top surface of each of said clamps having said central member extending between and beyond each of said clamps, each of said outward members being hollow, said distal end of each of said outward members being open;
   a strap having a primary end and a secondary end, said primary end being coupled to said front side of said central member, said strap being oriented collinear with said central member, said central member being positioned behind the headrest post, said strap being extended in front of the headrest post; and
   a mating member being coupled to said front side of said central member, said mating member being spaced from said primary end of said strap, said secondary end of said strap releasably engaging said mating member wherein said strap is configured to couple said central member to the headrest post.

2. The assembly according to claim 1, wherein each of said cushions has a first surface, and a perimeter surface, said perimeter surface having a back side and a bottom side, said bottom side being upwardly arcuate on said perimeter surface wherein said bottom side of said perimeter surface of each of said cushions is configured to conform to a respective one of the user's shoulders.

3. The assembly according to claim 2, further comprising a pair of posts, each of said posts being coupled to a respective one of said cushions.

4. A head securing assembly being configured to be mounted on a seat in a vehicle for laterally supporting a person's head, said assembly comprising:
   a pair of clamps, each of said clamps being positionable on a top side of a backrest of a seat in a vehicle, each of said clamps having a first end, a second end, a bottom surface and a top surface, said bottom surface of each of said clamps being concavely arcuate between said first and second ends such that said first end a respective one of said clamps is spaced from said second end of said respective clamp having each of said clamps forming a U shape wherein each of said clamps is configured to conform to the top side of the backrest, each of said clamps being positioned on opposite sides of a headrest post with respect to each other;

a support being coupled to each of said clamps, said support being directed forwardly from the backrest of the seat, said support having a central member extending between a pair of outward members, said central member having a bottom side and a front side, said bottom side being coupled to said top surface of each of said clamps having said central member extending between and beyond each of said clamps, each of said outward members being hollow, said distal end of each of said outward members being open;

a strap having a primary end and a secondary end, said primary end being coupled to said front side of said central member, said strap being oriented collinear with said central member, said central member being positioned behind the headrest post, said strap being extended in front of the headrest post;

a mating member being coupled to said front side of said central member, said mating member being spaced from said primary end of said strap, said secondary end of said strap releasably engaging said mating member wherein said strap is configured to couple said central member to the headrest post;

a pair of cushions, each of said cushions being slidably coupled to said support wherein each of said cushions is configured to be positioned on opposite sides of a user's head when the user sits in the seat thereby inhibiting the user's head from tipping to the left or to the right when the user is sleeping, each of said cushions having a first surface, and a perimeter surface, said perimeter surface having a back side and a bottom side, said bottom side being upwardly arcuate on said perimeter surface wherein said bottom side of said perimeter surface of each of said cushions is configured to conform to a respective one of the user's shoulders; and a pair of posts, each of said posts being coupled to a respective one of said cushions, each of said posts being positioned on said back side of said perimeter surface of said respective cushion, each of said posts having a distal end with respect to said respective cushion, said distal end of each of said outward members of said support insertably receiving said distal end of a respective one of said posts wherein said first surface of each of said cushions is configured to engage a respective right and left side of the user's head, each of said cushions being spaceable a selected distance from said central member.

* * * * *